Jan. 29, 1957  C. S. SEMAR  2,779,050
DOOR CHECK AND HOLDOPEN
Filed March 30, 1953

INVENTOR
Claud S. Semar
BY
Willits, Helwig & Caillio
ATTORNEYS

United States Patent Office 2,779,050
Patented Jan. 29, 1957

2,779,050

DOOR CHECK AND HOLDOPEN

Claud S. Semar, Birmingham, Mich., assignor to General Motors Corporation, Detroit, Mich., a corporation of Delaware Application March 30, 1953, Serial No. 345,308

3 Claims. (Cl. 16—82)

This invention relates to a door check and holdopen, and more particularly to a check and holdopen device for an automobile door.

The invention disclosed and claimed herein is an improvement over the door check and holdopen disclosed in Semar Patent 2,513,751, which issued on July 4, 1950. In the apparatus shown in Figs. 3 and 4 of said patent, a check link is mounted on the automobile body and extends into the automobile door. The link carries a cam block which functions as a holdopen device, and the free end of the link in the door is formed into a hook. The door carries stop means in the form of a roller which engages the cam block to provide holdopen means and which engages the hook at the end of the link to provide a door check. In this structure the link is rigidly mounted on the body and is formed of spring steel so that it is yieldably urged into engagement with the roller.

The present invention is an improvement over this structure, in that the link is formed of rigid steel (as opposed to spring steel) and is pivotally mounted on the automobile body. In order to urge the link yieldably into engagement with the stop roller a separate leaf spring is provided. Since the link in the present invention serves only the function of a link and not the double function of link and spring, it may be more cheaply constructed and may be more rugged. Furthermore, the operation of the invention disclosed herein is improved in that there is no tendency for the link to cause the door to rebound toward closed position since the link has no spring action.

Other features and advantages of the invention will be apparent from the following description and from the drawing, in which.

Figure 1:
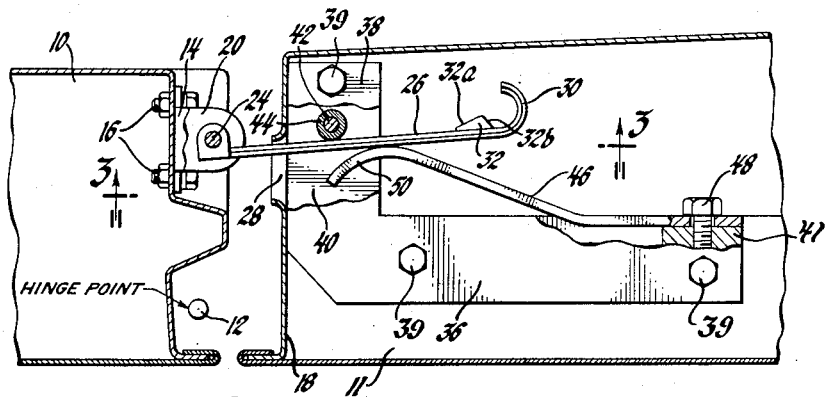
Fig. 1 is a horizontal section through a portion of the door and door pillar of an automobile having the improved structure mounted therein, the door being shown in closed position.

Referring now more particularly to the drawing, an automobile body member 10 may comprise a door mounting pillar having hingedly mounted thereon an automobile door 11. The hinging means are not shown since they may be conventional and well known in the art. The door 11 swings outwardly from the closed position of Fig. 1 to the open position of Fig. 2 about a hinging axis 12.

A support bracket 14 is secured by means of bolts 16 to the hinge face of the mounting pillar 10 adjacent the end face 18 of the door 11. The bracket 14 is in the form of a yoke having spaced arms 20 and 22 between which is mounted a pin 24 which forms a pivotal axis for a check link 26. While the check link preferably is mounted on the automobile body, it may, if desired, be mounted on the door 11 and may cooperate with stop means on the body. The link may be a steel stamping preferably formed with a longitudinal rib to increase the rigidity of the link.

Figure 3:
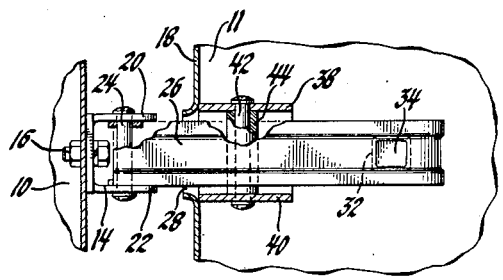
Fig. 3 is a fragmentary section along the line 3—3 of Fig. 1.

The free end of the link extends through an opening 28 in the face 18 of the door 11 and is formed into a hook 30 comprising a stop portion. Holdopen means comprising a cam block 32, which may be of die cast metal, is secured to the link adjacent the hook 30. Preferably the block 32 has an integral lug or shank portion 34 which projects through an opening in the link 26 and in staked on the reverse side of the link as shown in Fig. 3.

Inside the door 11 and adjacent the face 18 thereof is bolted a support bracket 36 having spaced arms 38 and 40 between which is mounted a pin 42 carrying a roller 44. Arms 38 and 40 are held rigidly by bolts 39 which extend through said arms and through spacer blocks located between the arms. One spacer block is shown at 41 in Fig. 1. A leaf spring 46 is secured by means of a bolt 48 to the bracket 36, the free end of the spring projecting to a point adjacent the roller 44 and being curved into a sliding shoe portion 50 adapted to bear against the link 26 and yieldably urge said link into engagement with the roller 44.

Figure 2:
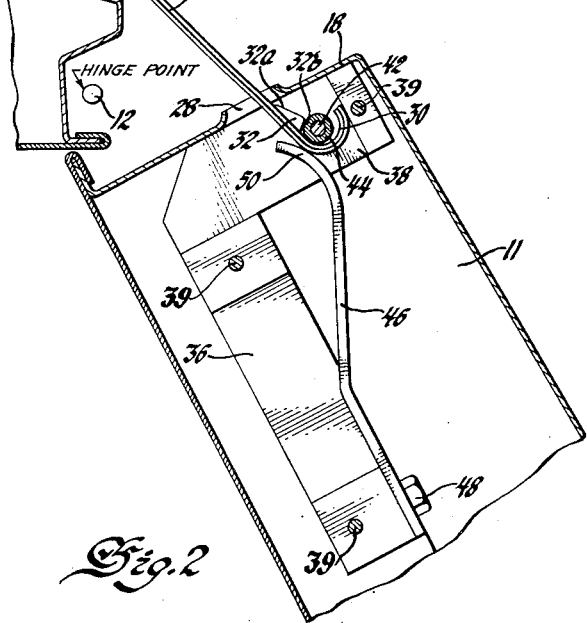
Fig. 2 is a section similar to Fig. 1, but with the door in open position.

The spring 46 urges the link 26 into engagement with the roller 44 as shown in Fig. 1, and consequently, when the door is opened, the roller 44 will ride over the inclined cam surface 32a of the holdopen block 32 and engage the hook portion 30 of the link 26. This engagement checks opening movement of the door, and the steeply inclined face 32b of the holdopen block 32 provides a yieldable holdopen action so that if the door is jerked open it will be rebound only slightly from its fully open position and will come to rest in the position shown in Fig. 2. Since the link 26 is pivotally mounted and is not a spring member, there is only a straight away pull on this link and there is no tendency for it to spring the door back toward closed position. At the same time, the leaf spring 46 constantly urges the link 26 into engagement with the roller 44 so that the door check and holdopen operates without rattling.

While I have shown and described one embodiment of my invention, it is capable of many modifications. Changes, therefore, in the construction and arrangement may be made without departing from the spirit and scope of the invention as set forth in the appended claims.

I claim:

1. A check and hold-open for body and door members, comprising: a check link having a curved hook at one end forming a positive stop member; means for mounting said check link on one of said members; a support bracket mounted on the other of said members; stop means on said support bracket adapted to engage in the bight of said hook positively to stop relative movement between said body and door members; and a spring fixedly mounted on said support bracket and having a portion slidably engaging said link to yieldably urge said link into engagement with said stop means.

2. A check and hold-open for body and door members, comprising: a check link having a shank formed with an integral curved hook, a portion of which forms an acute angle with the shank; means for pivotally mounting said check link on said body member; a support bracket mounted on said door member; stop means mounted on said support bracket and adapted to engage the curved hook portion of said link; and a flat leaf spring fixedly mounted on said support bracket and having a portion slidably engaging said link to yieldably urge the link into engagement with said stop means.

3. A check and hold-open for body and door members, comprising: a check link having a straight shank terminating in a hook bent over one side thereof at one end, said hook forming a positive stop member, hold-open means comprising a cam block on the shank portion of said link adjacent said hook and on the same side of the link as said hook; means for pivotally mounting the other end of said straight shank of the link on the body member; an L-shaped support bracket mounted on the door member, said bracket having opposite side walls; stop means comprising a pin mounted on said bracket between the walls thereof, said pin being adapted to engage the cam block and hook; and a leaf spring fixedly mounted on said support bracket and having a portion slidably engaging the shank of said link on the opposite side from said hook to yieldably urge said link into engagement with said stop means.

References Cited in the file of this patent

UNITED STATES PATENTS

| | | |
|---|---|---|
| 1,357,655 | Sandell | Nov. 2, 1920 |
| 2,313,582 | Rees | Mar. 9, 1943 |
| 2,513,751 | Semar | July 4, 1950 |
| 2,639,458 | Travis | May 26, 1953 |
| 2,656,215 | Harvey | Oct. 20, 1953 |
| 2,693,616 | Cromwell et al. | Nov. 9, 1954 |

FOREIGN PATENTS

| | | |
|---|---|---|
| 11,793 | Austria | May 11, 1908 |